UNITED STATES PATENT OFFICE.

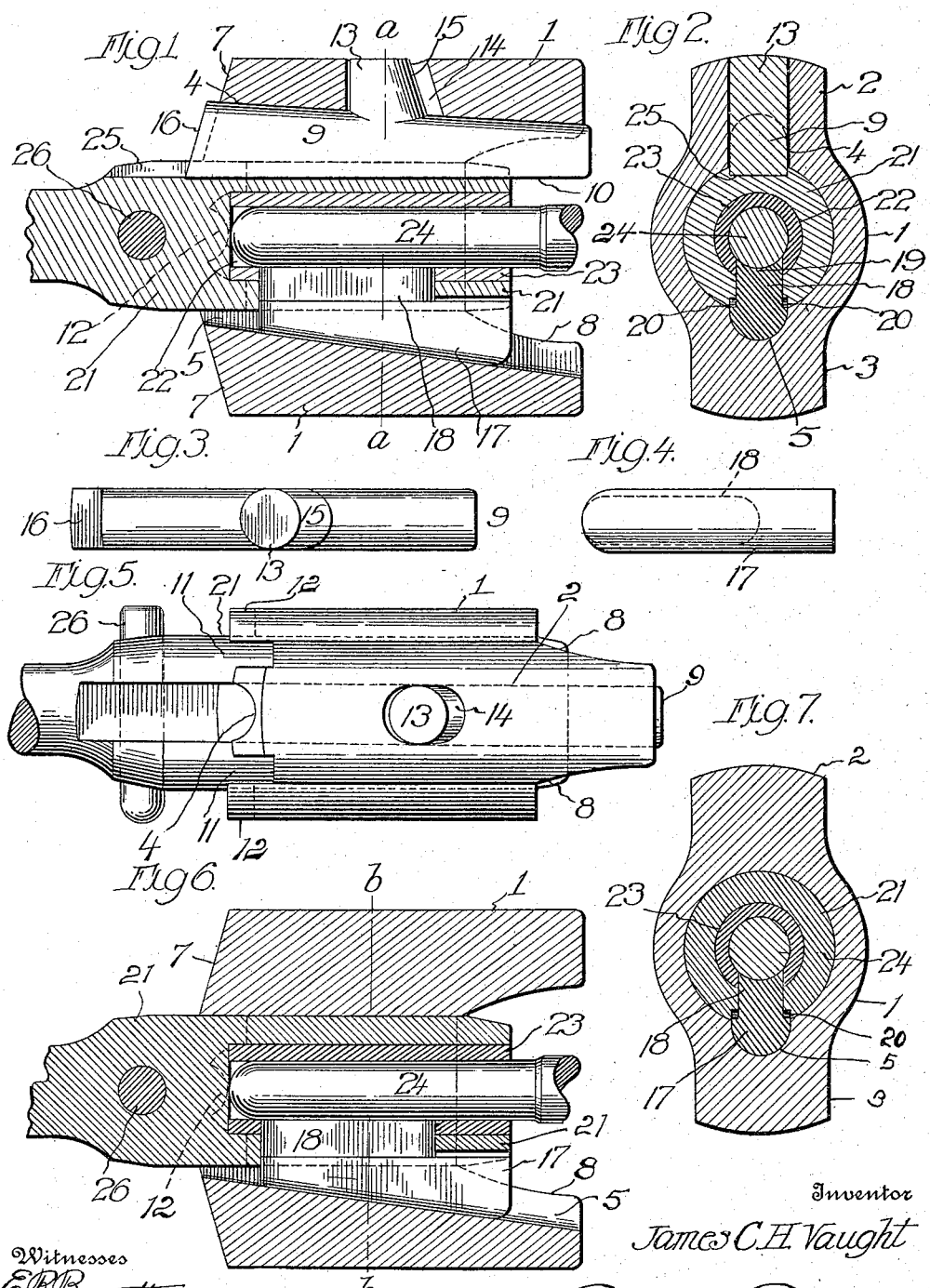

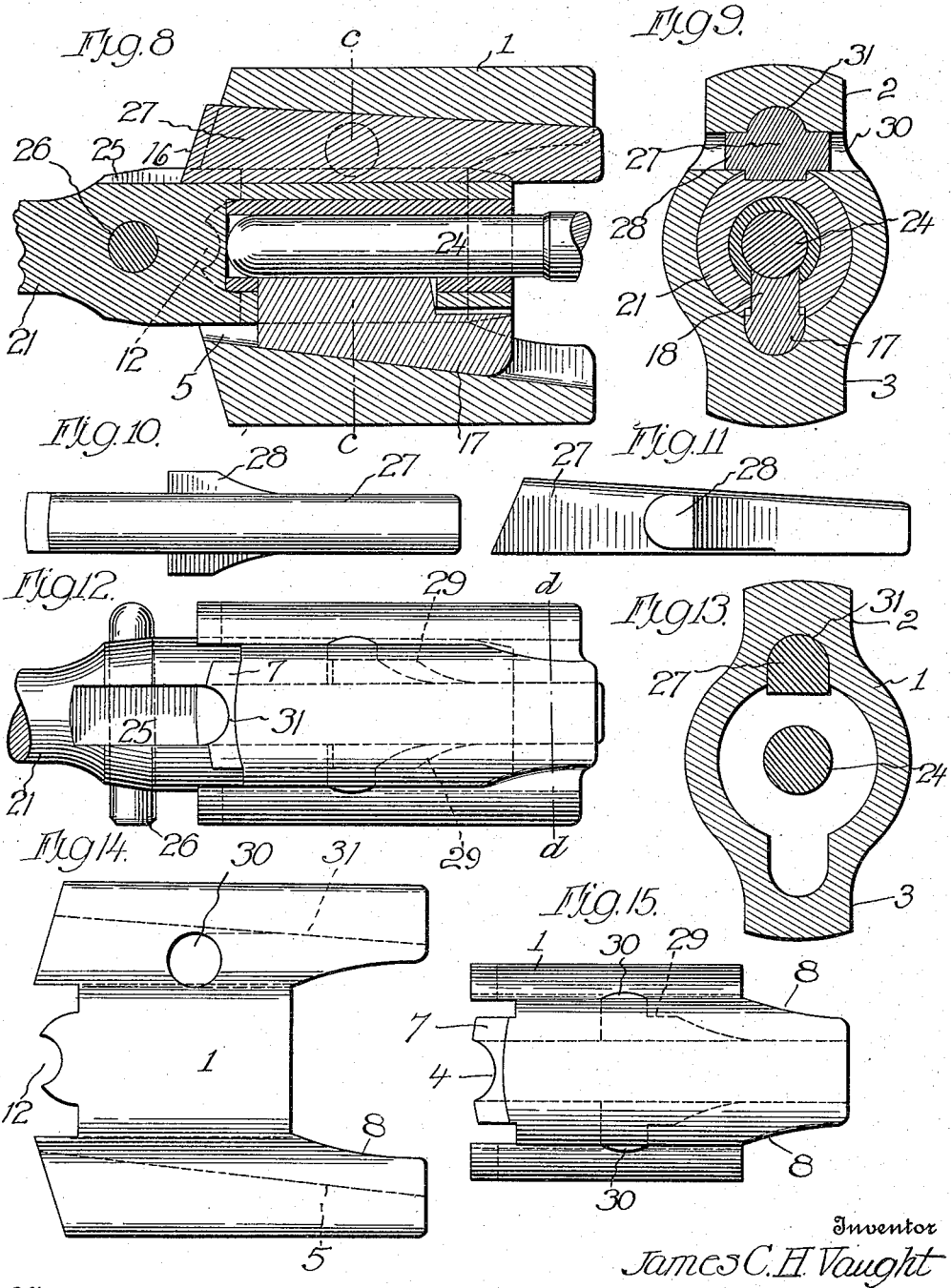

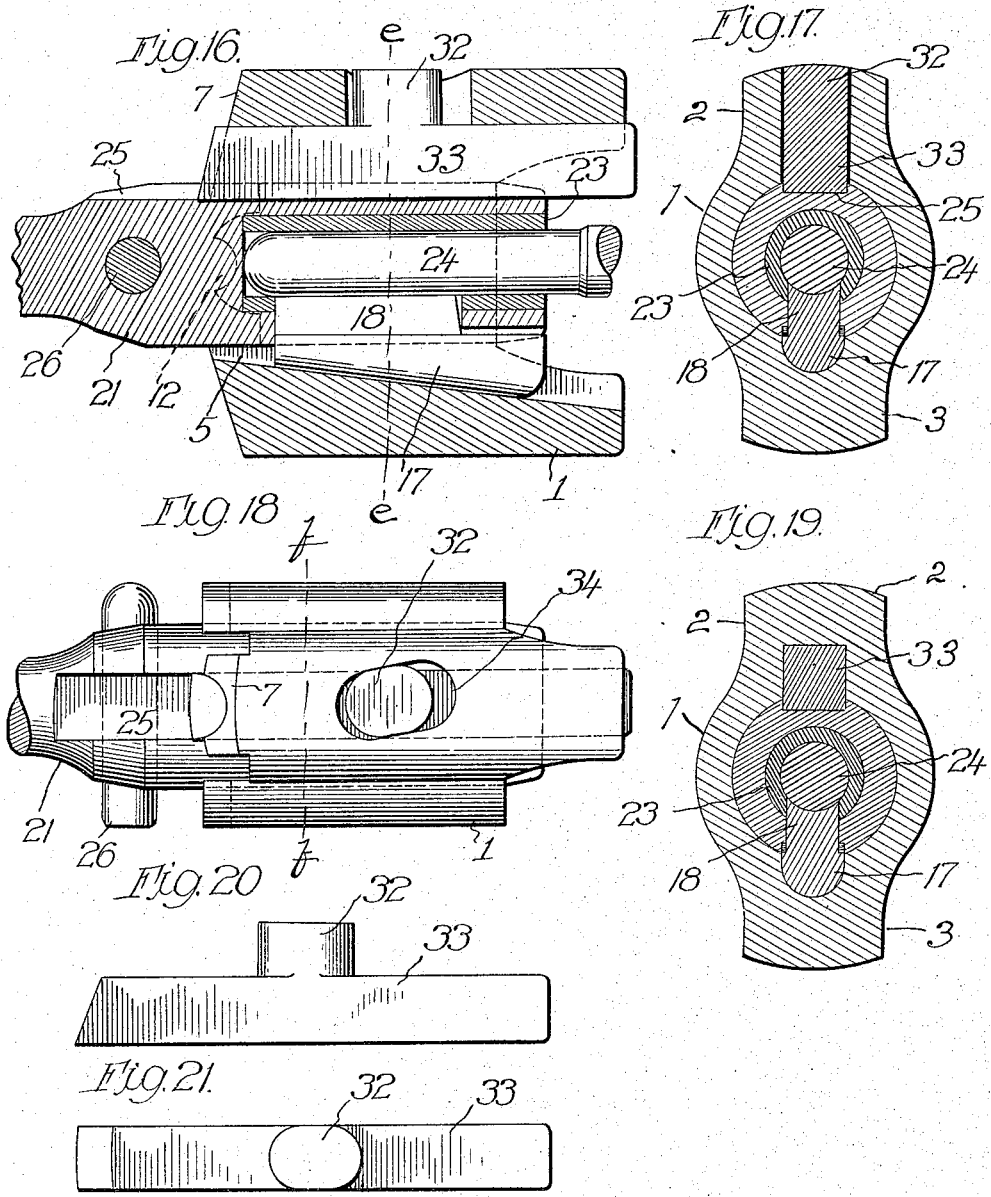

JAMES C. H. VAUGHT, OF DETROIT, MICHIGAN.

CHUCK FOR ROCK-DRILLS.

1,171,009.   Specification of Letters Patent.   Patented Feb. 8, 1916.

Application filed March 3, 1914.   Serial No. 822,245.

*To all whom it may concern:*

Be it known that I, JAMES C. H. VAUGHT, a citizen of the United States of America, residing at Detroit, in the county of Wayne and State of Michigan, have invented certain new and useful Improvements in Chucks for Rock-Drills, of which the following is a specification, reference being had therein to the accompanying drawings.

This invention relates to chucks for rock drills and more particularly to that type disclosed by Patent No. 804,904, granted to me November 21st, 1905, Patent No. 1,068,612, granted to me July 29th, 1913, and Patent No. 1,083,310, granted to me January 6th, 1914, all of which show effective devices to facilitate the operation of changing drills.

The present invention aims to provide a simple, durable and inexpensive chuck embodying a sliding sleeve having a projection at an end thereof to receive a hammer blow when it is desired to release the sleeve from the tapered face of a gib forming part of the chuck.

The invention further aims to provide a perfectly balanced chuck wherein provision is made to preclude any possibility of interior parts thereof becoming torn out or displaced, due to the stresses and strains to which the chuck is subjected.

The invention further aims to provide a chuck having a sleeve projection arranged to project over the retaining and releasing key, thus eliminating any danger of the same being broken, particularly when used in connection with that type of chuck disclosed by Patent No. 1,083,310.

The invention still further aims to accomplish the above and other results by a mechanical construction that will be hereinafter specifically described and then claimed, and reference will now be had to the drawings, wherein—

Figure 1 is a longitudinal sectional view of a preferred form of chuck; Fig. 2 is a cross sectional view of the same taken on the line $a$—$a$ of Fig. 1; Fig. 3 is a plan view of a retaining and releasing key; Fig. 4 is a plan of a gib; Fig. 5 is a plan of the chuck illustrated in Fig. 1 and Fig. 2; Fig. 6 is a longitudinal sectional view showing a chuck like that illustrated in Fig. 1 with the retaining and releasing key omitted; Fig. 7 is a cross sectional view taken on the line $b$—$b$ of Fig. 6; Fig. 8 is a longitudinal sectional view of a slightly modified form of chuck; Fig. 9 is a cross sectional view taken on a line $c$—$c$ of Fig. 8; Fig. 10 is a plan of the modified form of retaining and releasing key; Fig. 11 is a side elevation of the modified form of retaining and releasing key shown in Fig. 10; Fig. 12 is a top plan showing a slightly modified form of chuck; Fig. 13 is a cross sectional view taken on a line $d$—$d$ Fig. 12; Fig. 14 is a side elevation of the sleeve shown in Fig. 8; Fig. 15 is a top plan of the same; Fig. 16 is a longitudinal sectional view of a slightly modified form of chuck as compared with any of the above cited figures; Fig. 17 is a cross sectional view taken on the line $e$—$e$ Fig. 16; Fig. 18 is a top plan of the chuck shown in Fig. 16; Fig. 19 is a cross sectional view taken on the line $f$—$f$ Fig. 18; Fig 20 is a side elevation of the retaining and releasing key shown in Fig. 16, and Fig. 21 is a top plan of the same.

In describing my invention by aid of the views above referred to, I desire to point out that I intend the same as merely illustrative of an example whereby my invention may be applied in practice, and I do not limit my invention to the precise arrangement and construction of parts shown. The following description is therefore to be broadly construed as including such constructions and arrangements as are the obvious equivalent of those shown.

Reference will first be had to Figs. 1 to 5 inclusive illustrating the preferred form of construction. As best shown in Figs. 2 and 3, the chuck comprises a sleeve 1 having diametrically opposed exterior longitudinal enlargements or ribs 2 and 3 and these enlargements are provided with longitudinal tapering grooves 4 and 5 respectively, said grooves tapering in opposite directions and having the rounded bottoms thereof in substantially parallel planes, as best shown in Fig. 1. The grooves 4 and 5 are in communication with the cylindrical bore or longitudinal opening of the sleeve 1, and the inner end of the enlargements 2 and 3 are beveled, as at 7, at the inner end of the sleeve. The inner end of the sleeve has the sides thereof cut away, as at 11, to form notched bearings 12, the purpose of which will presently appear. The outer ends of the enlargements 2 and 3 protrude from the outer or front end of the sleeve by the sides of the sleeves or body being cut away, as at 8.

Adjustably mounted in the groove 4 of the enlargement 2 is a tapering key 9 having a flat side 10. The opposite side of the tapering key is rounded to conform to the rounded bottom of the groove 4 and said rounded side of said key has an integral projection or stud 13 extending into a recess or opening 14 provided therefor in the enlargement 2 of the sleeve. One side of the stud 13 is disposed at a right angle to the longitudinal axis of the chuck to form a shoulder and the opposite side thereof is inclined or beveled, as at 15, opposite a beveled wall of the recess or slot 14. The outer end of the stud 13 is flush with the surface of the enlargement 2, and said key is of a length slightly greater than the enlargement, whereby the inner beveled end 16 thereof will protrude from the inner end of the groove 4.

Slidably mounted in the groove 5 of the sleeve 1 is a gib 17 having the bottom thereof rounded to conform to the rounded bottom of the groove 5. The top of the gib 17 is substantially flat and is provided with an oblong tongue 18 having a concave face 19. The tongue 18 is of a less width than the gib, as best shown in Fig. 2, and provides longitudinal shoulders 20.

Extending into the sleeve 1 of the chuck is a head or body 21 having the outer end thereof provided with a socket 22 containing a bushing 23 adapted to receive the shank 24 of a drill steel. The body 21 has the top thereof provided with a longitudinal groove 25 to receive the key 9 and the bottom of said head is cut away and slotted to receive the gib 17, the tongue of said gib extending into a slot of the bushing 23 to engage the shank 24 of the drill.

The head 21 has a transverse opening and mounted in said opening is a pin 26 which is engaged by the notched side bearings 12 of the sleeve of the chuck, said pin coöperating with the key 9 and the gib 17 in preventing the sleeve and the drill from becoming accidentally displaced relatively to the body 21.

With the various elements assembled as described, the end of the key 9 is housed by the enlargement 2, consequently it is practically impossible to break the end of the key and impair its usefulness. All of the small parts of the chuck are securely housed by the sleeve.

In Figs. 6 and 7 there is illustrated a simplified form of chuck wherein the releasing key 9 is dispensed with, consequently it is not necessary to provide the head or body 21 with the groove 25. In a great many instances, the gib 17 is sufficient to hold the drill, and in this construction the sleeve is much stronger and serves as well as the preferred form of chuck.

In Figs. 8 to 15 inclusive there is illustrated a further modification of the invention, wherein a key 27 has side extensions 28 serving the same purpose as the stud 13 of the preferred form of construction. The inner walls of the sleeve are cut away, as at 29, to provide clearance for the side extensions 28 and the sides of the sleeve have diametrically opposed openings 30. The key 27 is similar in other respects to the key 9, and the construction of the sleeve is best shown in Figs. 14 and 15, where it will be observed that the upper inner wall of the sleeve has a groove 31 to receive the rounded upper edge of the key, while the flat lower edge thereof rides in the groove 25 of the body 21.

A still further modification of the invention is illustrated in Figs. 16 to 21, wherein a stud 32 on a bar 33 extends into an angularly disposed slot 34 in the top of the enlargement 2 of the sleeve, and besides this construction, the taper of the key or bar is dispensed with, since said bar is practically self-tightening and coöperates with the gib in properly holding the shank of a drill.

I attach considerable importance to the fact that the most essential elements of the chuck are fully protected by the sleeve and by providing the key with a lateral projection to engage a recess in the sleeve, the key is held in place wholly within the sleeve, so that the heavy strokes and jars to which a tool of this character is subjected will not cause the key to snap off.

What I claim is:

1. In a drill chuck, the combination with a body having a shank socket, and a gib slot leading thereto, of a gib having an inclined outer face, a releasing key having an oppositely inclined outer face, a sliding sleeve provided with grooves to engage the gib and key and force the gib inward, and a projection on the front end of the sleeve for the purpose specified.

2. In a drill chuck, the combination with a body having a shank socket, and a gib slot leading thereto, of a gib having an inclined outer face, a retaining and releasing key having an oppositely inclined outer face, a projection on the key, the same being removed from the ends of the key, a sliding sleeve provided with grooves to engage the gib and key and force the gib inward, a recess in the sleeve to accommodate the projection on the key, and a projection on the front end of the sleeve for the purpose specified.

3. In a drill chuck, the combination with a body having a shank socket, and a gib slot leading thereto, of a gib adapted to the slot, a retaining and releasing key provided with a shoulder removed from its opposite ends, a sliding sleeve provided with interior longitudinal grooves to correspond with the gib and key, an inner recess in the sleeve to correspond with the shoulder on the key, and a projection on the front end of the sleeve for the purpose specified.

4. In a chuck for rock drills, the combination with a body and a socket therein to receive the shank of a drill steel, a slot leading to said socket, a gib in the slot, and a movable sleeve surrounding the body and gib, the sleeve being provided with a projection on its front end as and for the purpose specified.

5. In a chuck for rock drills having a body and a socket therein to receive the shank of a drill steel, a slot leading to said socket, a gib in the slot, and a sliding sleeve surrounding the body and gib, said sleeve being provided with projections on its front end, for the purpose specified.

6. In a chuck for rock drills having a body and a socket therein to receive the shank of a drill steel, a slot leading to said socket, a longitudinally movable sleeve surrounding the body and gib, the movable sleeve being provided with an exterior rib and an interior groove to accommodate the gib, and projections on the front end of the movable sleeve for the purpose specified.

7. In a drill chuck, the combination with a body having a socket therein to receive the shank of a drill steel and a gib slot leading thereto, of a gib in the slot, a retaining key, a sliding sleeve surrounding the body, gib and key provided with interior grooves and with exterior ribs in which the grooves are located, and a projection on the front end of the sleeve, for the purpose specified.

8. In a drill chuck, the combination with a body having a shank-socket, of a gib having an inclined outer face, a retaining and releasing key having a shoulder removed from its ends, a movable member surrounding the body gib and key and provided with a recess corresponding to the shoulder on the key and with interior longitudinal grooves to correspond with the gib and key for the purpose specified.

In testimony whereof I affix my signature in presence of two witnesses.

JAMES C. H. VAUGHT.

Witnesses:
ANNA M. DORR,
LEWIS E. FLANDERS.

Copies of this patent may be obtained for five cents each, by addressing the "Commissioner of Patents, Washington, D. C."